United States Patent
Engstrom et al.

(10) Patent No.: US 7,372,829 B2
(45) Date of Patent: May 13, 2008

(54) POINT TO MULTIPOINT CELL PLAN AND MIGRATION

(75) Inventors: Anna Barbro Ulrika Engstrom, Gothenburg (SE); Martin Nils Johansson, Molndal (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 541 days.

(21) Appl. No.: 10/536,413

(22) PCT Filed: Jan. 13, 2003

(86) PCT No.: PCT/SE03/00035

§ 371 (c)(1),
(2), (4) Date: May 25, 2005

(87) PCT Pub. No.: WO2004/064430

PCT Pub. Date: Jul. 29, 2004

(65) Prior Publication Data

US 2006/0034207 A1    Feb. 16, 2006

(51) Int. Cl.
*H04Q 7/00*    (2006.01)
(52) U.S. Cl. .................. 370/328; 320/321; 455/447; 455/446; 455/562.1
(58) Field of Classification Search .......... 370/320, 370/321, 328; 455/447, 446, 562.1
See application file for complete search history.

(56) References Cited

U.S. PATENT DOCUMENTS

| | | | |
|---|---|---|---|
| 5,838,670 A | | 11/1998 | Billstrom |
| 6,445,926 B1 | * | 9/2002 | Boch et al. ............... 455/447 |
| 6,748,218 B1 | * | 6/2004 | Johnson et al. ........... 455/446 |
| 6,847,820 B1 | * | 1/2005 | Hageltorn et al. ........ 455/446 |
| 7,177,598 B2 | * | 2/2007 | Klein et al. .............. 455/63.1 |
| 2001/0055970 A1 | | 12/2001 | Muramoto et al. |

FOREIGN PATENT DOCUMENTS

WO    WO 9535601 A1    12/1995

OTHER PUBLICATIONS

Swedish Patent Office, International Search Report for PCT/SE03/00035, dated Aug. 22, 2003.

* cited by examiner

*Primary Examiner*—Joseph Feild
*Assistant Examiner*—S. Smith
(74) *Attorney, Agent, or Firm*—Roger S. Burleigh

(57) ABSTRACT

The present invention relates to cell plans and cell plan changes in point to multipoint systems (PMP). A cell plan arrangement is provided comprising cells having four 90° sectors to which individual sector at least one of four orthogonal channels, such as channels distinguished by two frequencies and two polarisations, are allocated. A method is furthermore provided allowing gradual sector-by-sector migration into a 45° sector cell plan. The cell plan offers advantageous carrier to interference ration (C/I) improvements.

11 Claims, 9 Drawing Sheets

POINT TO MULTIPOINT CELL PLAN AND MIGRATION

FIELD OF THE INVENTION

The present invention relates to cell plans and cell plan changes in point to multipoint systems (PMP). More particularly, the present invention relates to cell plans in which initially at least four sectors are available per base station and wherein for instance four channels are available.

BACKGROUND

In cellular systems, cell planning is necessary as the frequency spectrum is limited and since it is usually necessary to re-use the given frequency spectrum. In fixed wireless cellular systems the carrier to interference ratio (C/I) is an important system parameter, which infers limitations on other system design parameters such as which particular modulation scheme can be used for transmitting signals over the air.

For the above type of systems, C/I improvements can be obtained by spatial filtering, e.g. utilizing fixed multi-beam antennas in cellular systems.

EP1176839 shows a point to multipoint system having sectorised antennas splitting the cells into 90° sectors. By "slanting the hubs", please confer FIG. 12 and 13 of EP1176839, it should be possible to minimize co-polar interference.

WO9721309 shows a cell plan using 180° sectors.

U.S. Pat. No. 5838670 shows a point to multipoint radio access microwave system of which FIG. 2A and 2c show cell plans consisting of two unique cell configurations that are periodically distributed over a geographic area. The cell pattern has a reuse distance of two. The cell configurations of FIG. 2A make use of 90° sectors whereby the same channel is used in opposite directions. The structure of the cell configuration of FIG. 2C makes use of 45° sectors and has been reproduced as FIG. 2 of the present document.

FIG. 1 shows a known cell plan according to a sector antenna point to multipoint (PMP) time division multiplex access (TDMA) system denoted MINI-LINK BAS by Ericsson, "MINI-LINK BAS Planning and Engineering Manual", AE/LZT 111 0541 R1B, Ericsson Microwave Systems AB, 2001.

Typically, the frequency band and the number of channels are fixed according to official regulations pertaining to the site where the system is allowed to operate. So when more users demand more capacity, one way to enhance the capacity of the system is to further sectorise the cells.

This operation will require a new cell plan requiring new equipment and antennas to be mounted in the base-stations and modification of existing antennas from for instance a 90° sector pattern to a 45° sector pattern. In systems where various polarisations are used, antennas may be re-arranged so as to accomplish a change from e.g. a vertical polarisation to a horizontal polarisation. Therefore, migration properties of the above type of system should be considered.

SUMMARY OF THE INVENTION

It is a first object of the present invention to set forth an improved cell plan arrangement utilising sector antennas with regard to C/I value and migration prospects.

It is a further object to further improve C/I conditions.

It is a further object to set forth a method for performing channel change in a cell plan arrangement involving at least one sector being split.

It is a further object to set forth a method for performing channel change involving at least two sectors being split.

Further advantages will appear from the following detailed description of the invention.

DETAILED DESCRIPTION OF PREFERRED EMBODIMENTS OF THE INVENTION

In the following, the terminology of cells and sectors will be used. A cell relates to the immediate area illuminated by a hub, whereas sectors relate to the areas splitting a given cell. The cell will be inhabited by a number of terminals, which preferably are of fixed location. It should be understood that a given sector could be defined by the direction at which it is positioned to the hub it belongs to. Hence, in the following the notion "corresponding same" sector relates to those sectors which are orientated in the same given direction in relation to those respective cells in which the sectors can be found rather than pertaining to one particular sector in a given cell.

Figure 3:
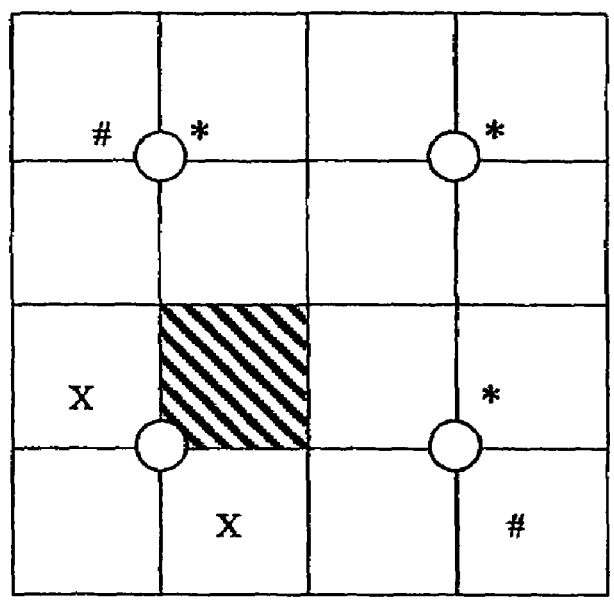
FIG. 3 shows a 2×2 hub cell plan comprising four cells with 90° sectors, wherein the symbols X, * and # illustrate optimisation constraints 1,2 and 3, respectively, with respect to the cross-hatched sector.
Figure 4:
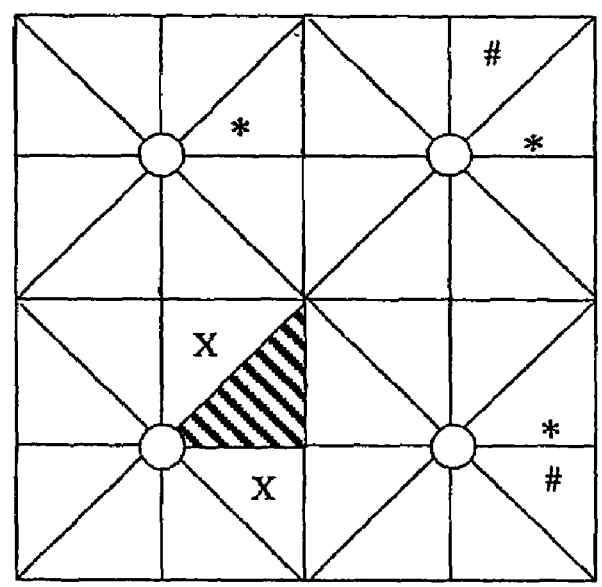
FIG. 4 shows a 2×2 hub cell plan comprising four cells with 45° sectors, wherein the symbols X, * and # illustrate optimisation constraints 1,2 and 3, respectively, with respect to the cross-hatched sector.

Let us consider the 2×2 hub unit cell shown in FIG. 3 for 90° cells and in FIG. 4 for 45° cells. If four unique channels are available and symmetries are disregarded, $4^{16}$ and $4^{32}$, cell plans are possible for 90° and 45° cell plans, respectively.

However, a large number of these possible cell plans are not relevant, since some co-channel assignments are not desirable. Supposing that a given channel has been allocated to a given exemplary sector (cross-hatched) in FIGS. 3 and 4, the following constraints would apply:
1) No co-channel assignment is allowed in the adjacent sectors at the same hub (X),
2) No co-channel assignment is allowed in the same sectors at other hubs (*),
3) No co-channel assignment is allowed in the sectors at the two adjacent hubs in the direction of the sector borders (#).

When considering the 45° sectors of FIG. 4 the following additional constraints can be chosen:
4) A particular channel is allocated to an even number of sectors per cell.

If a smooth migration from 90° to 45° sectors is desired, a fifth constraint can be applied to the 45° cell plans. In this example, the channel is characterised by one frequency and one polarisation:
5) In two adjacent 45° sectors spanning a former 90° sector, the polarisation must be the same as in the 90° sector.

The above-mentioned constraints were posed as optimisation criteria for various aspects of the present invention.

Figure 5:
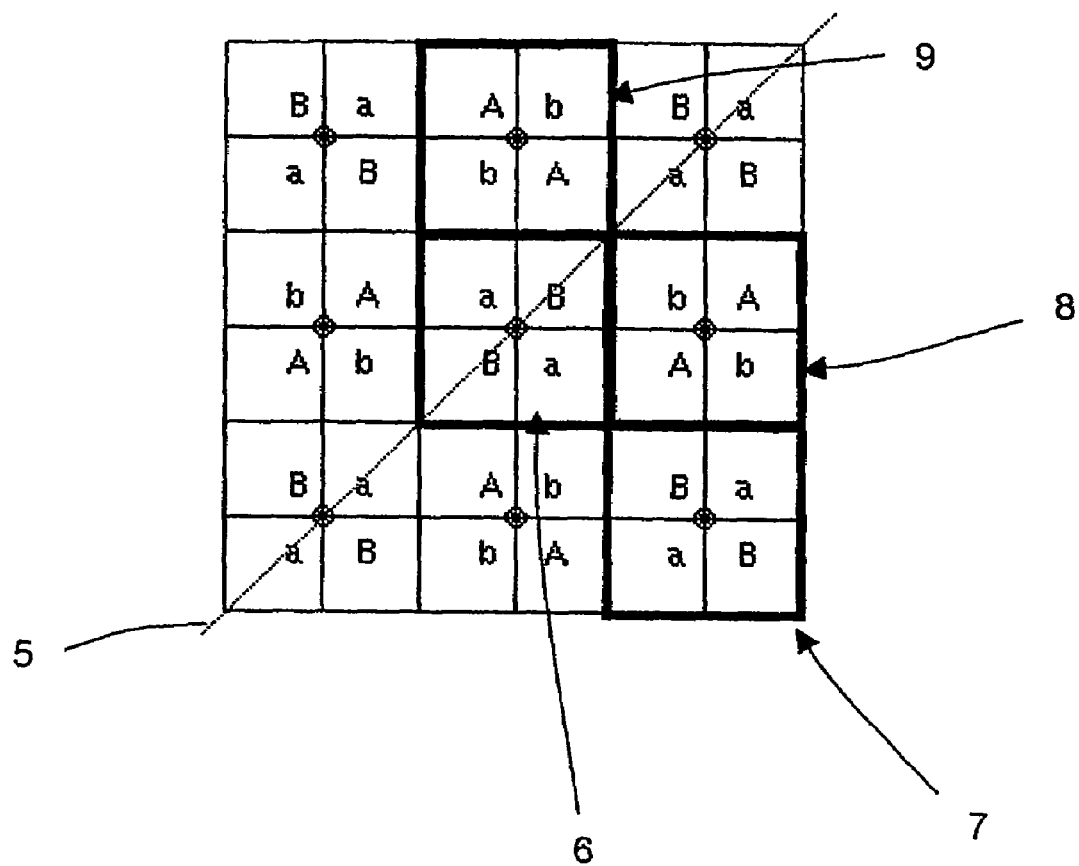
FIG. 5 shows an exemplary excerpt of a 90° sector cell plan according to a first embodiment of the invention, FIG. 6 discloses the maximum number of simultaneous primary uplink co-channel interferers per sector in the 90° cell plan of FIG. 5 constrained to a 3×3 hub extension, being three, one and zero, respectively, including the sectors with maximum three and zero simultaneous co-channel interferers, being the worst and best sectors from an uplink C/I perspective, whereby the sectors without any figure have a maximum of one simultaneous co-channel interferer, FIG. 7 discloses the maximum number of simultaneous primary uplink co-channel interferers per sector in the 45° cell plan of FIG. 2, being two, one and zero, respectively, whereby the sectors with a maximum of two and zero simultaneous co-channel interferers are indicated, being the worst and best sectors from an uplink C/I perspective and whereby the sectors without any figure have a maximum of one simultaneous co-channel interferer, FIG. 8 discloses CDF (cumulative distribution function) of uplink C/I per sector for the known 90° cell plan shown in FIG. 1 for a 3×3 hub cell plan extension including the maximum number of co-channel interferers per sector (3', 1' or 0', respectively), FIG. 9 discloses CDF of uplink C/I per sector for the 90° cell plan shown in FIG. 5 for a 3×3 hub cell plan extension including the maximum number of co-channel interferers per sector (3', 1' or 0', respectively)

FIG. 5 shows an exemplary excerpt of a 90° sector cell plan according to a first embodiment of the invention. This cell plan arrangement has very advantageous C/I properties.

It should be understood that the 90° cell plan of FIG. 5 is also applicable to both smaller and larger networks, as the 3×3 hub network is only an exemplary configuration of the periodic pattern.

The hubs in the above cell plan describe a grid of substantially square shaped cells, which of course in the actual realisation may be subject to some distortion due to the geography encountered.

The above cell plan arrangement comprises cells having four 90° sectors. At least one of four orthogonal channels may be allocated to each individual sector. For instance two frequencies and two directions of polarisation are used.

The arrangement has a first cell type 6 having a first channel a allocated to sectors of opposite direction and a second channel B allocated to sectors of opposite directions, and a second cell type 7 having the same channel allocation as the first cell type but arranged 90° rotated with respect to the first cell type 6. The first and second cell types are being arranged in alternating or intermittent fashion along a diagonal 5.

The diagonal can be seen as a 45° line intersecting with the hubs in the substantially square shaped cell pattern.

The cell plan arrangement moreover comprises a third cell type 8 having a third channel b allocated to sectors of opposite direction and a fourth channel A allocated to sectors of opposite direction, and a fourth cell type 9 having the same channel allocation as the third cell type 8 but arranged 90° rotated with respect to the third cell type. Also the third and the fourth cell type are being arranged in intermittent fashion along a diagonal.

It is noticed that the first and third types are arranged intermittently along a line arranged 45 degree with respect to the diagonal 5. It is also noticed that the second and fourth types are arranged intermittently along another line arranged 45 degree with respect to the diagonal 5, although this being clear from the fact that both the first and second and as well the third and fourth cell types are arranged intermittently along diagonals.

Figure 6:
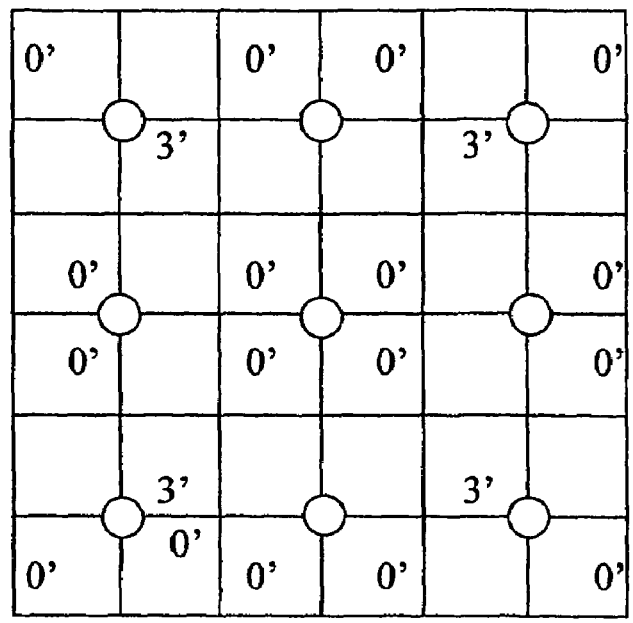

FIG. 6 discloses the maximum number of simultaneous primary uplink co-channel interferers per sector in the 90° cell plan of FIG. 5 constrained to a 3×3 hub extension, being three, one and zero, respectively, whereby the sectors without any figure have a maximum of one simultaneous co-channel interferer. As appears, the sectors with respectively a maximum of three simultaneous co-channel interferers are worst. The sectors with one interferer are intermediate and the sectors with zero interferers are best from an uplink C/I perspective.

Figure 2:
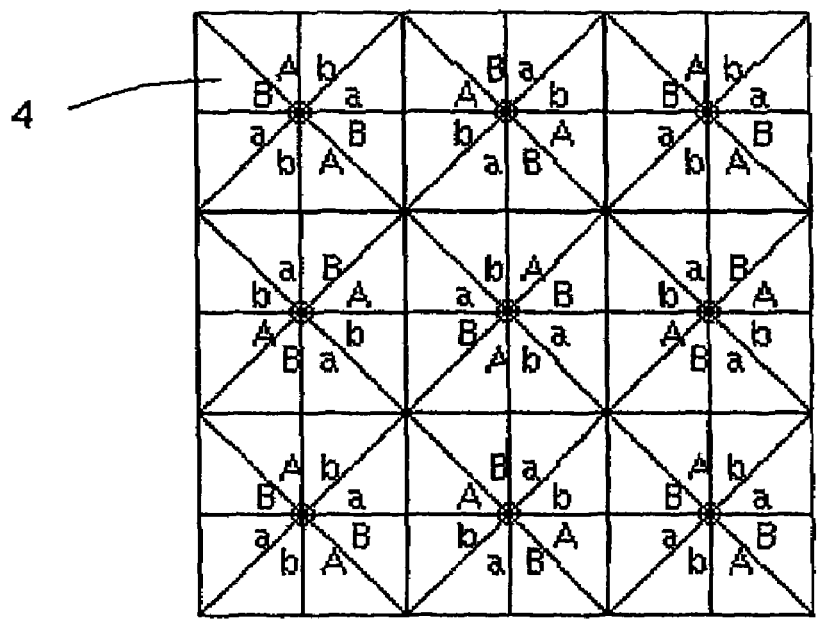
FIG. 2 shows an exemplary excerpt of a 45° sector cell plan having the same structure as a known PMP system.
Figure 7:
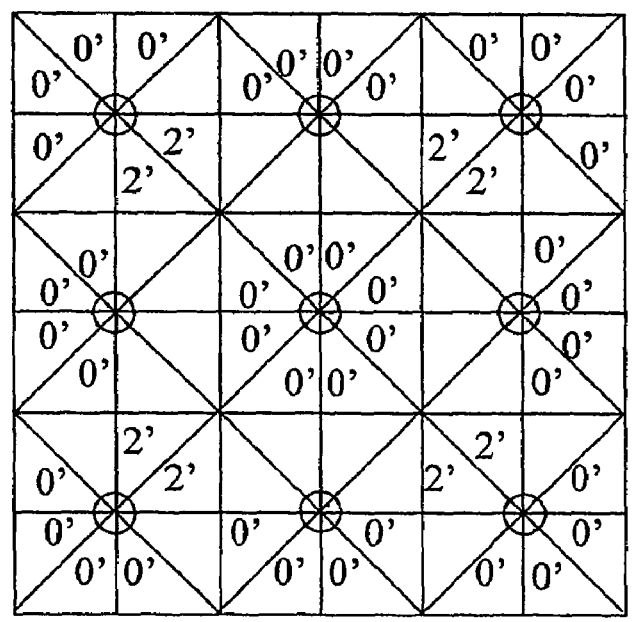

FIG. 7 discloses the maximum number of simultaneous primary uplink co-channel interferers per sector in the 45° cell plan of FIG. 2, being two, one and zero, respectively, and whereby the sectors without any figure have a maximum of one simultaneous co-channel interferer.

Note that the maximum number of primary co-channel interferers is reduced from three in the 90° cell-plan to two in the 45° cell plan as shown in FIGS. 6 and 7.

Figure 1:
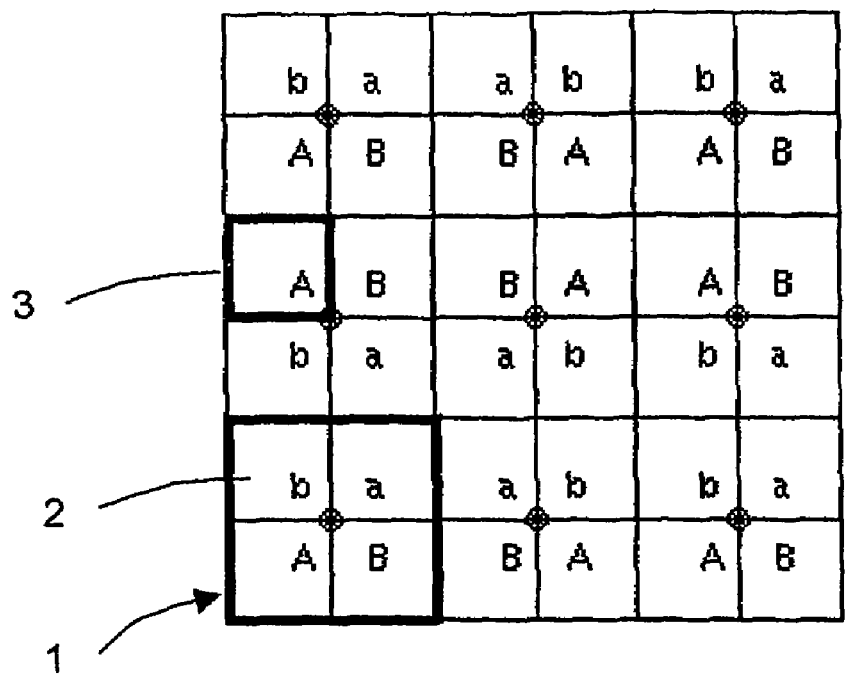
FIG. 1 shows an exemplary excerpt (3×3 hub) of a 90° sector cell plan of a known PMP system.
Figure 8:
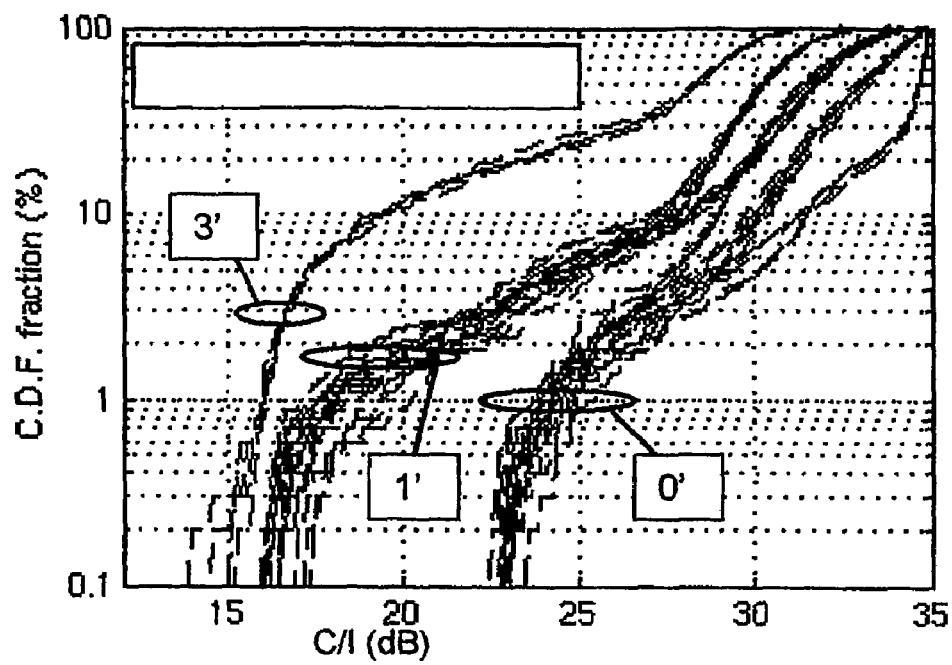

FIG. 8 discloses CDF of uplink C/I per sector for the known 90° cell plan shown in FIG. 1 for a 3×3 hub cell plan extension including the maximum number of co-channel interferers per sector. The ratio for sectors with three 3', one 1' or zero 0' interferers, respectively, have been indicated.

Figure 9:
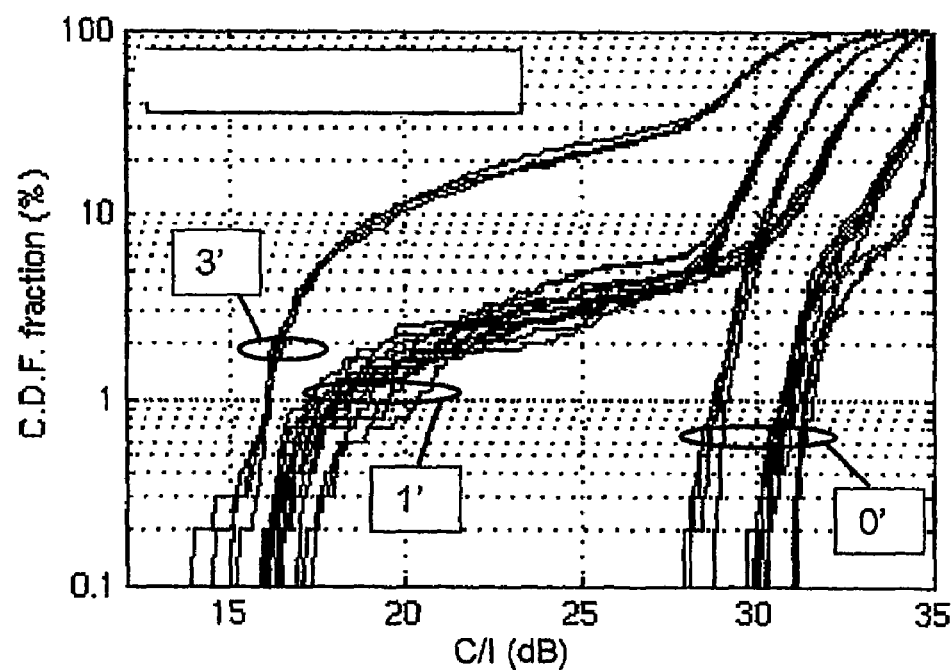

FIG. 9 discloses CDF of uplink C/I per sector for the optimum 90° cell plan shown in FIG. 5 for a 3×3 hub cell plan extension including the maximum number of co-channel interferers per sector. The ratio for sectors with three 3', one, 1' or zero 0' main interferers, respectively, have been indicated.

FIGS. 8 and 9 were produced by using a simulation tool supposing that all base-station and terminal antennae have a given non-ideal standard ETSI (European Telecommunications Standard Institute) class antenna characteristic including a certain side lobe pattern. The particular implementation of the cell plan will to a varying degree affect the interference stemming from the non-ideal side lobe pattern.

When comparing FIG. 9 with FIG. 8, it appears that a considerable gain in C/I has been accomplished for the 90° cell plan according to the invention for the sectors having zero main interferers. It is shown that C/I improvements of 5-7 dB have been accomplished for sectors that experience zero co-channel interferers. As appears the sectors having one or three main interferers are substantially unaffected. It should be noted that the improvements are strongly dependent on the appearing side lobe pattern.

The cell plan of FIG. 5 provides improved channel isolation for a frequency-only channel allocation and even better results for a combined frequency and polarisation channel allocation.

The improved C/I could pave the way for the introduction of higher-order modulation schemes for accomplishing higher bit-rates.

Moreover according to the invention, the cell plan of FIG. 5 serves as an excellent starting point for a migration into the known cell plan of FIG. 2.

According to a second aspect of the invention, a method is provided for migration from the above cell plan of FIG. 5 into the known cell plan of FIG. 2.

Regarding the migration from 90° to 45° sectors, the best result from a C/I performance perspective is obtained if the whole 90° cell plan of FIG. 5 is directly altered to the 45° cell plan of FIG. 2.

Various reasons could exist as to why the migration should be performed gradually, that is, why modifications should be carried out on a hub-by-hub basis. In the typical migration scenario, demands for more bandwidth appears among certain users at local areas in the cell plan. Consequently, it is advantageous to implement as little change as possible for satisfying those users. A gradual introduction of sectorisation prioritising those users or cells, which have particular demands, would typically constitute a more favourable economical solution.

According to the invention, the gradual implementation of network change in specific hubs can be performed while the remaining network is operating thereby incurring a minimum of outage during the network change.

The migration to the cell plan of FIG. 2 involves splitting 90° sectors into 45° sectors. By way of example, a sector split and channel change in a given first sector and subsequently in a second sector shall be explained. The given changed sectors will correspond to an excerpt of the cell plan of FIG. 2.

Figure 11:
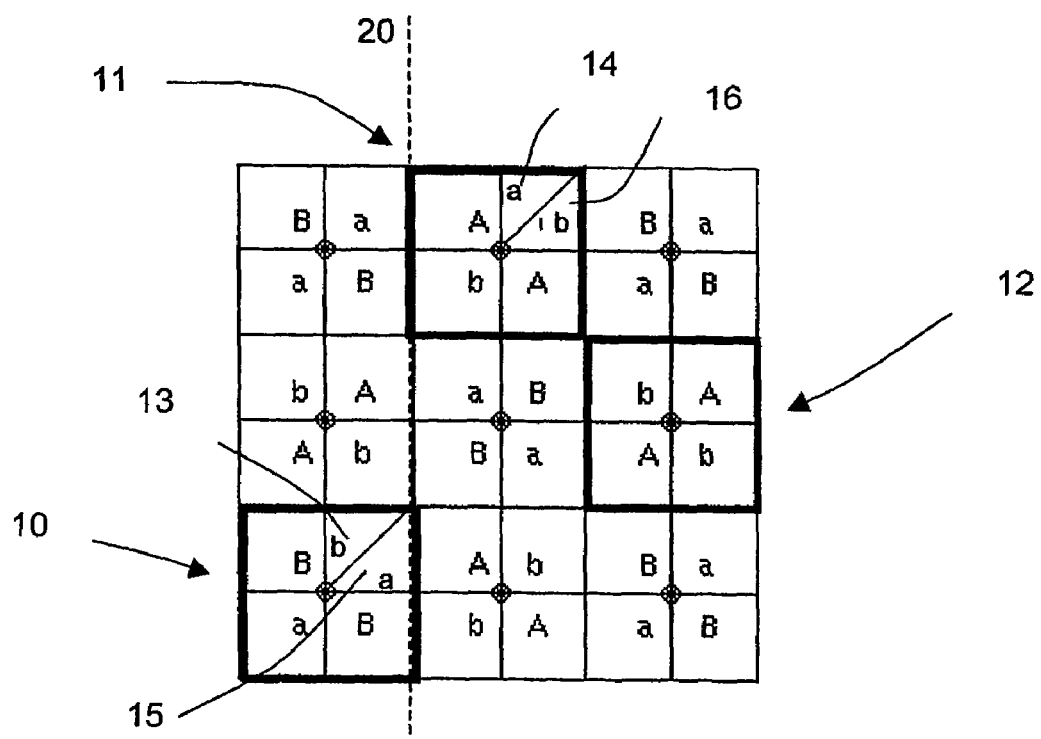
FIG. 11 shows a first and second cell split in a method of performing a cell change according to the invention.

Having regard to FIG. 11 only those 45° sectors pointing along or parallel (or sectors having at least one direction pointing substantially along or parallel) with a first line 20 to the 90° sector boundary, the first line being arranged 45° with respect to the diagonal 5, are "considered" for channel change, while sectors pointing along a line perpendicular to the first line shall remain unchanged. It is understood that the orientation of the line 20 is arbitrary as long as it remains defined during the change procedure. Those 45° sectors radiating along a first line 20 are candidates for channel change.

When identifying any first 45° sector 13 considered for channel change, a second 45° sector 14 at the corresponding sector position in a cell at knight's range 11 found in the direction of the identified 45° sector is identified. Subsequently, the channel of the identified first 45° sector 13 is changed so as to adopt the channel b used under the old cell plan of FIG. 5 at the location corresponding to the second 45° sector 14. As indicated in FIG. 11, the sector 13 of cell 10 changes from a to b.

It should be understood that the term, cell at knight's range, is used in analogy to the moving range of the knight in the game chess, whereby the cells correspond to the squares of the chessboard. In the present example cells 11 and 12 are at knigth's range with respect to cell 10.

Any further non-changed sector considered for sector split and subsequent channel change could be chosen using the same change rules as set out above.

When selecting a sector pointing "out of bounds"—e.g. sector 14 in cell 11 in FIG. 11 pointing towards no other sector—the further change would involve that the channel of the identified second 45° sector 14 is changed so as to adopt the channel used under the old cell plan of FIG. 5 at the location corresponding to the identified first 45° sector 13, hence sector 14 of cell 11 changes from b to a.

Sector 15 and 16 remains unchanged since they are not oriented so as to radiate along line 20.

It should be noted that channels eligible for adoption are those originally found in the cell plan.

It should be noted that it is possible to reverse from the 45° cell plan of FIG. 2 back to the 90° cell plan of FIG. 5.

According to a preferred migration plan according to the invention, the channels in the FIG. 5 cell plan are allocated in the following way: Channels a, and b denote first and second frequencies of a first polarisation while channels A and B denote the same first and second frequencies, but of a second polarisation, orthogonal to the first polarisation.

It is seen that when migrating from the FIG. 5 cell plan to the FIG. 2 cell plan, the individual areas corresponding to the 90° sectors keep their individual polarisation when the sector is split. As an example the sector using channel B in cell 7 in FIG. 5 is split into sectors using channels A and B and the sector using channel a is split into b and a.

A frequency change can generally be more easily implemented than a polarity change. For instance, the terminals can be adapted to the new cell plan by a software update. This is the background for the fifth constraint mentioned above.

Figure 10:
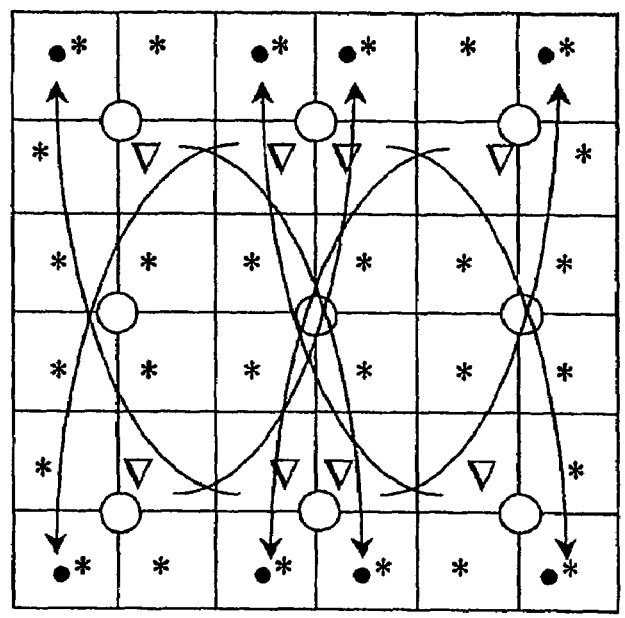
FIG. 10 shows a migration strategy to be used when migrating sector-by-sector from the cell plan of FIG. 2 to FIG. 5.

According to a further embodiment of the invention, a careful consideration of the whole 90° cell plan improves the C/I performance on networks of $\geq 3 \times 3$ hubs. The considerations are illustrated in FIG. 10 for the migration (or split) of the 90° cell plan of FIG. 5 into the 45° cell plan of FIG. 2.

If any 90° sector in the middle row of cells should be split into two 45° sectors, then no other 90° sector is affected. The same holds for the outermost corner sectors of the corner cells, and their respective nearest neighbours. All these 90° sectors are marked with * in FIG. 10.

If any of the eight 90° sectors marked with ∇ is to be split into two 45° sectors, then the sector at knights range • marked with an arrow should preferably be split into two 45° sectors. In the present example, in total eight sectors marked with ∇ and the eight corresponding sectors marked • should preferably be changed simultaneously. Otherwise, the sectors marked with • could host a potential primary co-channel interferer. Note that the reverse is not necessary: If the sectors marked with • are to be split, it is unnecessary to split also the sectors marked with ∇.

Taking the above precaution into account, a successive migration is therefore considered possible inflicting no adverse C/I conditions in other cells than those immediately affected during a gradual channel change operation. The individual channel assignment of the new 45° sectors should be identical to that shown in FIG. 2.

For 1×1 and 2×2 cell networks, the optimum 90° cell plan could be migrated into the optimum 45° cell plan on a sector-by-sector basis, without any adverse conditions appearing.

The cell plan that appears after all cells have been split can be defined by the following:

The cell plan arrangement comprises cells having eight 45° sectors to which individual sector at least one of four orthogonal channels, such as two frequencies and two polarisations, may be allocated, the arrangement having a first cell type having a first, a second, a third and a fourth channel allocated to sectors of opposite direction and a second cell type having the same channel allocation as the first cell type but arranged 90° rotated with regard to the first cell type. The first and second cell types are arranged in alternating fashion along a vertical or horizontal line intersecting with the hubs. The cell plan arrangement moreover comprises a third cell type having the first, second, third and fourth channels allocated to sectors of opposite direction, wherein the first and second channel being interchanged around a first diagonal with regard to the first and second channels of the first cell type. The third and fourth channels are interchanged around a second diagonal with regard to the first and second channels of the second cell type. There is furthermore provided a fourth cell type having the same channel allocation as the third cell type but arranged 90° rotated with regard to the first cell type. The third and fourth cell type are being arranged in alternating fashion along a vertical or horizontal line intersecting with the hubs, wherein no first and third cell type are arranged such that sectors of the same channel are situated adjacently.

According to further aspects of the invention it is also possible to arrive at other cell plans than the one shown in FIG. 2 when starting from FIG. 5.

Figure 12:
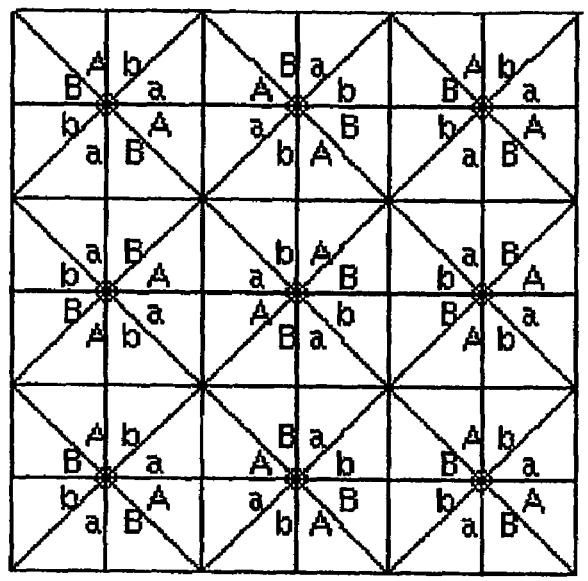
FIG. 12 shows a first sub-optimal cell plan which is apt for migration from the FIG. 5 cell plan.

FIG. 12 shows a first sub-optimal cell plan which is apt for migration from the FIG. 5 cell plan.

Figure 13:
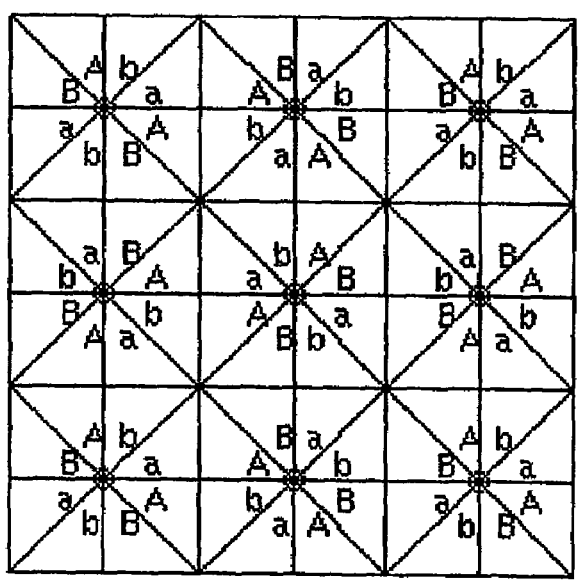
FIG. 13 shows a second sub-optimal cell plan, which is apt for migration from the FIG. 5 cell plan.

FIG. 13 shows a second sub-optimal cell plan, which is apt for migration from the FIG. 5 cell plan.

Figure 14:
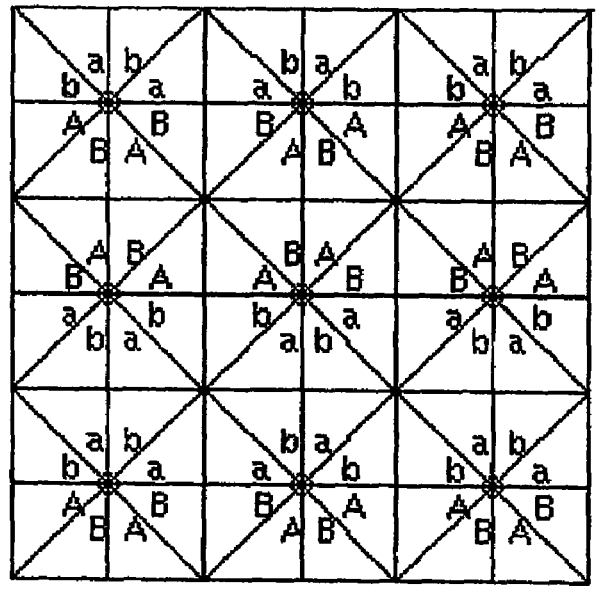
FIG. 14 shows a third sub-optimal cell plan that is apt for migration from the FIG. 1 cell plan.

FIG. 14 shows a third sub-optimal cell plan that is apt for migration from the FIG. 1 cell plan.

Figure 15:
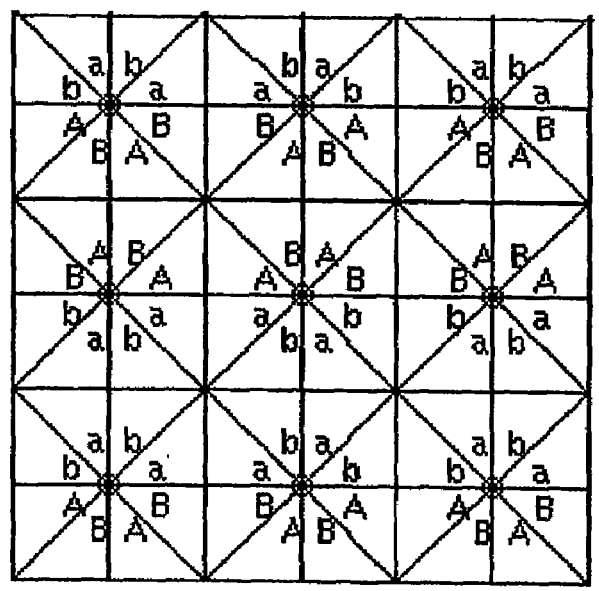
FIG. 15 shows a fourth sub-optimal cell plan that is apt for migration from the FIG. 1 cell plan.

FIG. 15 shows a fourth sub-optimal cell plan that is apt for migration from the FIG. 1 cell plan.

Figure 16:
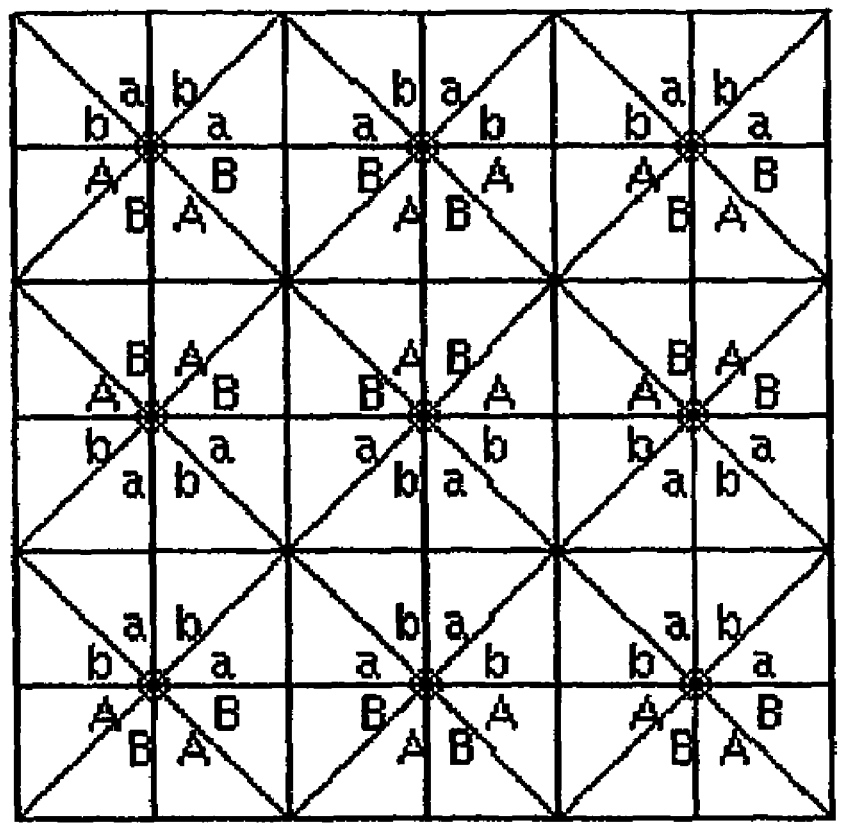
FIG. 16 shows a fifth sub-optimal cell plan that is apt for migration from the FIG. 1 cell plan.

FIG. 16 shows a fifth sub-optimal cell plan that is apt for migration from the FIG. 1 cell plan.

In conclusion, a cell plan arrangement has been provided with beneficial carrier to interference properties and which can be incrementally migrated into a second cell plan arrangement of higher capacity. Moreover various sub-optimal cell plan arrangements apt for migration have been provided.

The invention claimed is:

1. Method of performing a migration from a first cell-plan to a second cell plan,
    the first cell plan comprises cells having four 90° sectors to each of which one of four orthogonal channels (a, b; A, B) are allocated;
    the first cell plan includes four specific cell types (6, 7, 8, 9) which are periodically repeated over the first cell plan, each cell type having a specific allocation of channels (a, b; A, B) to specific sectors; wherein
    a particular channel is allocated to an even number of sectors per cell;
    no same channel (a, b; A, B) is allocated to corresponding sectors (*) - that is, sectors having a given orientation - of all four cell types;
    no same channel (a, b; A, B) is allocated to adjacent sectors (X) of any cell type;
    no same channel (a, b; A, B) is allocated to a particular sector of any given cell type and an adjacent sector (#) of any other cell type to the corresponding sector of the particular sector found in the directions of the sector boundaries of the particular sector; the method comprising the step of
    splitting a given pair of corresponding 90° sectors of the first and third (6, 8) cell type, respectively, or of the second and fourth (7, 9) cell type, respectively, into two pairs (13, 14; 15, 16) of corresponding split 45° sectors; and re-allocating channels by interchanging channels for one (13, 14) of said two pairs of corresponding split sectors while keeping the channel allocation for the other (15, 16) of said two pairs of split sectors according to the first cell plan,
    the first and third (6, 7) types of cells being selected such that any splitting and re-allocation can be performed such that after the re-allocation, adjacent sectors of a given cell have different channels.

2. Method according to any of claim 1, wherein the at least four orthogonal channels are distinguished by two frequencies (a, A; b, B) and two polarisations (a, b; A, B).

3. Method according to any of claim 2, wherein the polarisation of any split sector remains unchanged in relation to the former 90° sector during the migration from the first to the second cell plan.

4. Method according to any of claim 2, wherein for those split sectors which are affected by channel change to the second cell plan, only a frequency change is necessary.

5. Method according to claim 1, wherein the first cell plan has a 3*3 cell extension, and wherein the migration initially involve splitting middle row cells and corner sectors of corner cells (*).

6. Method according to claim 1, wherein only 45° sectors pointing along a first line (20) parallel to a 90° sector boundary are considered for channel change while sectors pointing along a line perpendicular to the first line shall remain unchanged.

7. Method according to claim 1, wherein for said pair (13, 14) of corresponding split sectors for which the step of splitting and re-allocating channels is performed, one split sector (14) is found in the beam coverage of the other split sector (13).

8. Method according to claim 7, wherein said corresponding pair of split sectors are found in cells (10, 14) which can be said to be arranged at positions in relation to one another which resembles, by analogy to the game of chess whereby the cell plan cells correspond to the positions of the chessboard, a given position of the knight and its moving range.

9. Method according to claim 1, wherein the sector splitting and channel re-allocation of all subsequent migration steps are performed in the same manner for all cells corresponding to the given pair of corresponding 90° sectors of the first and third (6, 8) cell type, respectively, or of the second and fourth (7, 9) cell type, respectively.

10. Method according to claim 1, wherein the first cell plan being arranged with
    a first cell type (6) having a first channel (a) allocated to sectors of opposite direction and a second channel (B) allocated to sectors of opposite directions, and a second cell type (7) having the same channel allocation as the first cell type but arranged 90° rotated with respect to the first cell type, the first and second cell type being arranged in intermittent fashion along a first line;
    a third cell type (8) having a third channel (b) allocated to sectors of opposite direction and a fourth channel (A) allocated to sectors of opposite direction, and a fourth cell type (9) having the same channel allocation as the third cell type but arranged 90° rotated with respect to the third cell type,
    the third and fourth cell type being arranged in intermittent fashion along a second line;
    the first (6) and third cell (8) types being arranged intermittently along a third line.

11. Method according to claim 1, wherein the second cell plan is characterized by
    a particular channel is allocated to an even number of sectors per cell;
    no same channel (a, b; A, B) is allocated to corresponding sectors (*) of all four cell types;
    no same channel (a, b; A, B) is allocated to adjacent sectors (X) of any cell type;
    no same channel (a, b; A, B) is allocated to a particular sector of any given cell type and an adjacent sector (#) of any other cell type to the corresponding sector of the particular sector found in the directions of the sector boundaries of the particular sector.

* * * * *

UNITED STATES PATENT AND TRADEMARK OFFICE
CERTIFICATE OF CORRECTION

| | |
|---|---|
| PATENT NO. | : 7,372,829 B2 |
| APPLICATION NO. | : 10/536413 |
| DATED | : May 13, 2008 |
| INVENTOR(S) | : Engstrom et al. |

It is certified that error appears in the above-identified patent and that said Letters Patent is hereby corrected as shown below:

In Column 7, Line 65, in Claim 2, after "according to" delete "any of".

In Column 8, Line 1, in Claim 3, after "according to" delete "any of".

In Column 8, Line 5, in Claim 4, after "according to" delete "any of".

Signed and Sealed this

Fourth Day of November, 2008

JON W. DUDAS
*Director of the United States Patent and Trademark Office*